Patented Nov. 4, 1941

2,261,858

UNITED STATES PATENT OFFICE 2,261,858

PECTIN PRODUCT

Aksel G. Olsen, Battle Creek, Mich., assignor to General Foods Corporation, New York, N. Y., a corporation of Delaware No Drawing. Application May 2, 1939,
Serial No. 271,393

5 Claims. (Cl. 260—210)

This invention relates to powdered pectin and particularly to a novel form of and method of preparing powdered pectin which is readily dispersible and completely soluble in plain water.

Ordinary powdered pectin is soluble in water but does not disperse and go into solution when added thereto. Instead, it forms gummy viscous lumps which require many hours of soaking and swelling before a uniform solution is obtained. The common commercial practice therefore is to mix such pectin with a large proportion of a dispersing agent such as sugar which has the effect of keeping the pectin particles separated until they individually go into solution. On the other hand, other forms of pectin such as the pectinates obtained by precipitation of pectin from solution with metal ions, as for instance aluminum, copper, calcium, barium and the like, are readily dispersible but insoluble in water. U. S. Patent No. 2,115,479 discloses a method of so adjusting the calcium content of calcium pectinate that the product is readily dispersible and yet soluble in hot or acidified water. This product, however, as well as other pectinates referred to, is not pure pectin but contains substantial quantities of metal ions. Moreover, all pectins cannot be used to obtain the product of the above patent, a special pectin of low methoxyl content being required.

Both of the above dispersible and soluble products are suitable where the pectin is to be used in jam and jelly making or for other uses where the presence of sugar or of substantial quantities of metal ions is not objectionable. However, for many purposes it is desirable to have pectin solutions which are not sweetened and which do not contain substantial amounts of metal ions. This is particularly true, for example, in various therapeutic applications of pectin such as its use in the treatment of infected wounds, as a blood coagulator, and in intestinal therapy. Moreover, it is desirable for such purposes to be able to use pectin in any of its usual forms.

Accordingly, the principal object of the present invention is to provide a powdered pectin which is readily dispersible and completely soluble in plain water without the need for dispersing agents or the addition of substantial amounts of metal ions. The term "pectin" as herein used means any powdered pectin preparation soluble in water, irrespective of its method of manufacture, grade or degree of methylation.

I have discovered that soluble powdered pectin can be made readily dispersible and yet remain completely soluble in plain water if a small proportion of a suitable metal ion is distributed over the surface of the pectin particle. By this means I can prevent the usual rapid swelling of the pectin particles when brought in contact with water and thus permit dispersion of the pectin in the water before the individual particles become sticky and agglomerate into lumps. This incorporation of a metal ion in the surface layer produces a film of metal pectinate on the pectin particle, and the product is therefore to be distinguished from the powdered metal pectinates previously referred to in which the particles are composed of a metal pectinate throughout.

As examples of metal ions which are suitable for the purposes of the present invention may be mentioned iron, aluminum, copper, nickel and chromium. The amount of metal ion incorporated in the surface of the particle need be only enough to prevent agglomeration of the particles when added to water and only extremely small amounts are required. This is particularly advantageous in cases where the presence of substantial quantities of metal ions is objectionable, such as the therapeutic applications referred to above. Where this is not the case, higher concentrations of metal ions can be employed, subject to the limitation that concentrations at or near the precipitating threshold for the particular ion used may render the particles difficultly soluble or even insoluble.

The surface film of metal pectinate is preferably produced by suspending the powdered pectin in a solution in which the pectin particles do not dissolve and which contains a solvent non-reactive with the pectin and a dissolved salt of the desired metal. Such a solution may comprise, for example, a mixture of water with alcohol, acetone or other water-miscible organic solvent. The specific solvent used is not of importance, but since alcohol is readily available and easily recoverable, it is the solvent used in the following examples. In each of these examples the powdered pectin is thoroughly stirred into the solution, the stirring being continued a few minutes to assure contact between all pectin particles and the solution, after which the pectin is recovered on a suction filter, washed with a small amount of alcohol if desired, and then dried in the usual manner.

Example 1

| | | |
|---|---|---|
| Powdered pectin 80–200 mesh | gms | 880 |
| 20% aqueous solution AlCl₃.6H₂O | cc | 40 |
| Water | cc | 360 |
| 95% ethyl alcohol | cc | 1,200 |

Example 2

| | | |
|---|---|---|
| Powdered pectin 80–200 mesh | gms | 50 |
| 2% aqueous solution FeCl₃ | cc | 10 |
| Water | cc | 15 |
| 95% ethyl alcohol | cc | 75 |

Example 3

| | | |
|---|---|---|
| Powdered pectin 80–200 mesh | gms | 50 |
| 2% aqueous solution CuCl₂.2H₂O | cc | 25 |
| 95% ethyl alcohol | cc | 75 |

Pectins prepared according to the above examples dispersed promptly when stirred into water and went completely into solution, whereas pectins from the same lots but untreated formed large gummy lumps which remained undissolved for well over 24 hours. The actual proportion of metal ion to pectin necessary to achieve this effect is, as indicated above, exceedingly small. Thus in Example 1 the aluminum amounts to only 0.1% of the pectin, and in Examples 2 and 3 the iron and copper amount respectively to only 0.13% and 0.37% of the pectin. However, these proportions are not critical. As stated above, the upper limit of the amount of metal ion is determined by the point at which the pectin becomes difficultly soluble or insoluble which in the case of aluminum, for example, is between 1 and 2%. The lower limit, on the other hand, is dependent on the aggregate surface area of the pectin particles to be treated, being less the coarser the particles. For example, I have found that particles coarser than 200 mesh require only 0.1% aluminum to be readily dispersible, whereas particles finer than 200 mesh require as much as 0.3%.

That the above process results in the formation of a surface layer or film of pectinate, as distinguished from a homogeneous particle of pectinate, can be readily demonstrated by dissolving the treated pectin in distilled water, precipitating it with alcohol, and drying and grinding it to its original fineness. The resulting pectin particles, containing the original proportion of metal ion, are no longer dispersible but form gummy lumps when added to water in the same manner as the original untreated pectin. Furthermore such resulting nondispersible pectin can again be made dispersible by retreatment thereof with metal ion in accordance with the process of the invention to provide a surface film of metal pectinate on the particles.

While, as stated above, the present invention is especially useful in the treatment of pure pectin to obtain a dispersible and soluble product free of dispersing agents and undesirable amounts of metal ions, it will be understood that the invention is not limited thereto. Where the amount of metal ion is not of importance, as in the manufacture of jams and jellies and certain therapeutic applications, any suitable metal pectinate containing insufficient metal ion to render it readily dispersible may be treated by the process of the invention to obtain a dispersible product. It will further be appreciated that in cases where a particular metal ion or combination of metal ions together with pectin has desirable therapeutic or other properties, it may be preferable to increase the amount of the metallic component beyond the minimum necessary to obtain dispersibility.

What is claimed is:

1. A method of rendering soluble powdered pectin dispersible in water which comprises suspending the pectin particles in solution in which they do not dissolve and which contains a solvent non-reactive with the pectin and a metal ion selected from the group consisting of aluminum, copper, iron, nickel and chromium, the amount of metal ion being sufficient to react only with the surface layers of the pectin particles, and thereafter separating the reacted particles from the solution.

2. A powdered pectin product which is soluble and readily dispersible in cold water, said product consisting of individual particles of soluble pectin containing in the surface layers thereof a metal pectinate selected from the group consisting of aluminum, copper, iron, nickel and chromium pectinate and being substantially identical with the product formed by the process of claim 1.

3. A powdered pectin product which is soluble and readily dispersible in cold water, said product consisting of individual particles of soluble pectin containing aluminum pectinate in the surface layers thereof and being substantially identical with the product formed by the process of claim 1.

4. A powdered pectin product which is soluble and readily dispersible in cold water, said product consisting of individual particles of soluble pectin containing copper pectinate in the surface layers thereof and being substantially identical with the product formed by the process of claim 1.

5. A powdered pectin product which is soluble and readily dispersible in cold water, said product consisting of individual particles of soluble pectin containing iron pectinate in the surface layers thereof and being substantially identical with the product formed by the process of claim 1.

AKSEL G. OLSEN.